(12) United States Patent
Dietrich

(10) Patent No.: US 10,082,413 B2
(45) Date of Patent: Sep. 25, 2018

(54) MAGNETIC ACTUATED CONTACT USING A COIL SYSTEM

(71) Applicant: M MICRO TECHNOLOGIES, Pompano Beach, FL (US)

(72) Inventor: Frank Hermann Dietrich, Ostfildern (DE)

(73) Assignee: M MICRO TECHNOLOGIES, INC., Pompano Beach, FL (US)

( * ) Notice: Subject to any disclaimer, the term of this patent is extended or adjusted under 35 U.S.C. 154(b) by 431 days.

(21) Appl. No.: 14/820,959

(22) Filed: Aug. 7, 2015

(65) Prior Publication Data

US 2016/0349094 A1 Dec. 1, 2016

Related U.S. Application Data

(63) Continuation-in-part of application No. 14/721,642, filed on May 26, 2015.

(51) Int. Cl.
| | | |
|---|---|---|
| *G01L 9/14* | (2006.01) | |
| *G01F 23/26* | (2006.01) | |
| *G01D 5/165* | (2006.01) | |
| *H01C 10/08* | (2006.01) | |
| *H01C 10/44* | (2006.01) | |

(Continued)

(52) U.S. Cl.
CPC .......... *G01F 23/26* (2013.01); *G01D 5/165* (2013.01); *G01L 9/14* (2013.01); *H01C 10/08* (2013.01); *H01C 10/44* (2013.01); *H01C 10/14* (2013.01); *H01F 7/0294* (2013.01)

(58) Field of Classification Search
None
See application file for complete search history.

(56) References Cited

U.S. PATENT DOCUMENTS

2003/0112013 A1* 6/2003 Manz ................. G01N 27/4473
                                                       324/453
2014/0090978 A1* 4/2014 Tower, III ............ G01N 27/302
                                                       204/433

(Continued)

FOREIGN PATENT DOCUMENTS

DE 10304794 A1 9/2004
DE 10323765 A1 12/2004

*Primary Examiner* — Andre Allen
(74) *Attorney, Agent, or Firm* — Baker & Hostetler LLP

(57) ABSTRACT

A potentiometric sensor, comprising: a potentiometer track; a collector track opposite the potentiometer track; a conductive magnetic cushion slider coupled to the potentiometer track and the collector track; and a sealed body housing the potentiometer track, the collector track, and the conductive magnetic cushion is disclosed. The potentiometric sensor may provide a variable output voltage indicative of a level of liquid in a container. The output voltage of the potentiometric sensor may be based on a position of a magnet, which may determine a position of the conductive magnetic cushion or a ferromagnetic spring. The magnet may be outside of the sealed body. As the sensor will be more cost effective and less space consuming, the totally sealed sensor incorporating the conductive magnetic cushion or a ferromagnetic spring may replace many applications that allow a hysteresis of less than 1 mm. Additionally, these applications may be used on rotary systems.

8 Claims, 11 Drawing Sheets

(51) Int. Cl.
*H01F 7/02* (2006.01)
*H01C 10/14* (2006.01)

(56) References Cited

U.S. PATENT DOCUMENTS

2016/0216230 A1* 7/2016 Wilke .................. G01N 27/333
2017/0160228 A1* 6/2017 Pechstein ............. G01N 27/333

* cited by examiner

MAGNETIC ACTUATED CONTACT USING A COIL SYSTEM

CROSS-REFERENCE TO RELATED APPLICATIONS

This application is a continuation-in-part which claims priority to U.S. patent application Ser. No. 14/721,642, filed May 26, 2015, titled "MAGNETIC ACTUATED CONTACT USING A CONDUCTIVE MAGNETIC CUSHION," the disclosure of which is incorporated herein by reference in its entirety.

TECHNICAL FIELD

This disclosure relates generally to potentiometer technology, and in particular, potentiometric sensors using a conductive magnetic cushion or a coil system.

BACKGROUND

Potentiometric sensors may be used in various industrial applications, such as patient monitors, water heaters, passenger cars, earth movers, and drive train systems. Known potentiometers traditionally include several parts, including a sensing element, a wiper, outside terminals, a wiper carrier, a spindle or push rod, a bearing system, and a body. The sensing element translates the position angle or linear position of the wiper into an electrical signal. Potentiometric sensors include a resistor track and a collector track printed on a substrate. The wiper is a sliding contact that transfers the signal from the resistor track to the collector track. The resistor and collector tracks are connected to the outside terminals. The outside terminals provide an electronic signal to a user. The wiper is a micro-mechanic mostly stamped part using precious metal in the contact area. The wiper is assembled to an electrically isolated wiper carrier. The spindle or push rod moves the wiper carrier, which may change the output voltage of the potentiometric sensor or the resistance when used as a rheostat. The wiper, wiper carrier, and spindle or push rod are guided by a bearing system. All of these components are protected by and contained in a body.

Potentiometric sensors may be used to measure a level of a liquid in a container. For example, when measuring the level of water in a container, a water tank valve float may be coupled to the spindle or push rod of the potentiometric sensor. For example, if the level of water in the container is low (water tank valve float is in a lower position), the output voltage of the potentiometric sensor may be low. However, as the level of water in the tank increases, the water tank valve float rises and actuates the spindle or push rod of the potentiometric sensor to rise as well. Since the spindle or push rod rises, the wiper rises as well. This may cause the output voltage of the potentiometric sensor to increase. Thus, a low output voltage of the potentiometric sensor may indicate a low water level while a high output voltage may indicate a high water level.

However, the more components that are needed, the more expensive it is to manufacture the potentiometer sensor. Known potentiometers require many components, and thus, have a high manufacturing cost. Additionally, if the potentiometric sensor is used to measure the liquid level of a container, the potentiometric sensor should be able to withstand contamination. Accordingly, this disclosure overcomes these and other drawbacks of known potentiometer sensors.

SUMMARY

In one aspect of this disclosure, a potentiometric sensor comprising a potentiometer track; a collector track opposite the potentiometer track; a ferromagnetic coil connecting the potentiometer track and the collector track; and a sealed body housing the potentiometer track, the collector track, and the ferromagnetic coil is disclosed.

In another aspect of this disclosure, a multiple switch system comprising a resistance track; a collector track opposite the resistance track; a plurality of input switches coupled to the resistance track; an output coupled to the collector track; a ferromagnetic coil coupled to the resistance track, the collector track and one of the plurality of input switches so that the one of the plurality of input switches is electrically coupled to the output; and a sealed body housing the resistance track, the collector track, the plurality of input switches, the output, and the ferromagnetic coil is disclosed.

DETAILED DESCRIPTION

Figure 1:
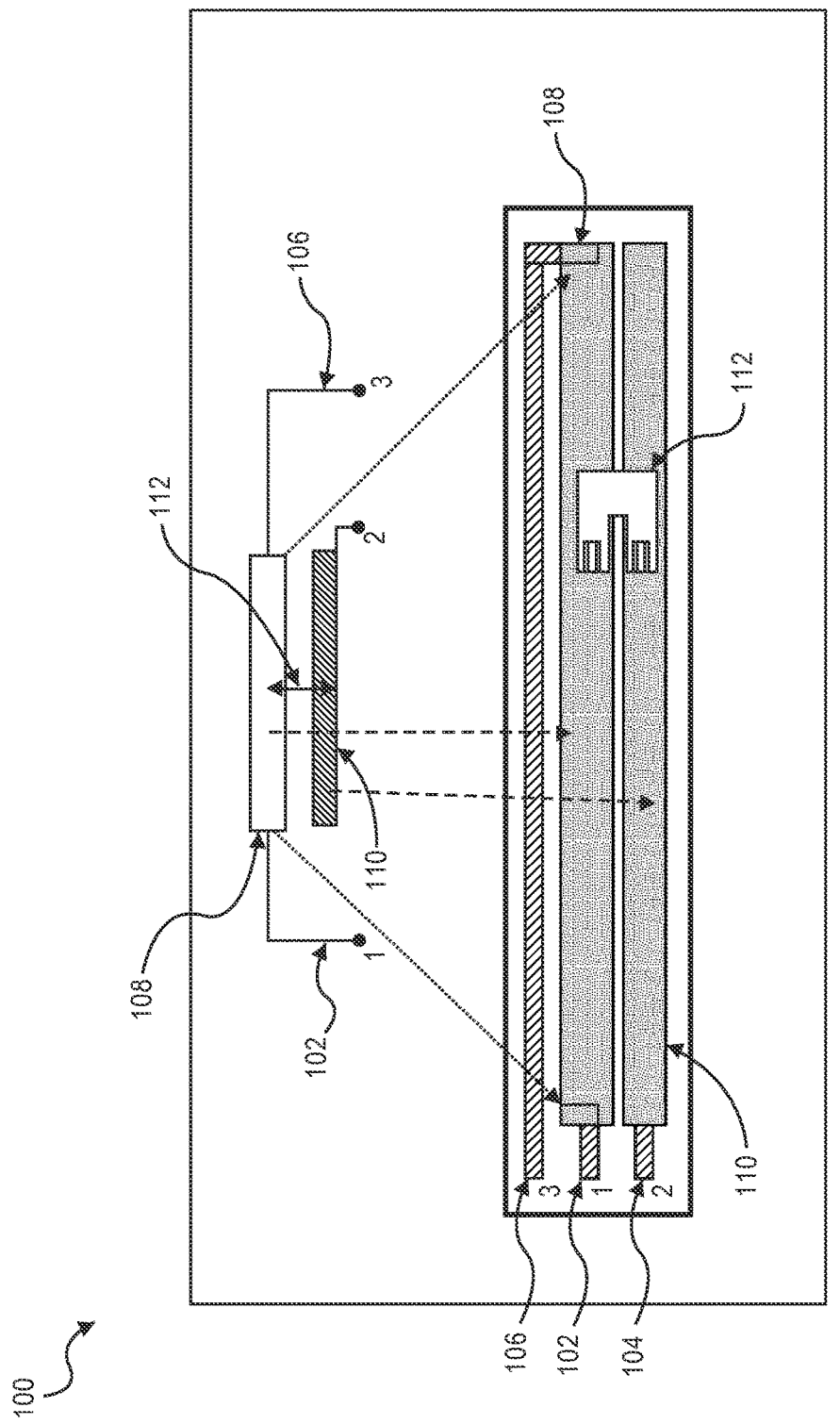
FIG. 1 illustrates a schematic diagram of a linear potentiometer element on a printed circuit board (PCB) with thick film print, according to the prior art.

FIG. 1 illustrates a schematic diagram of a linear potentiometer element 100 on a printed circuit board (PCB) with thick film print, according to the prior art. The linear potentiometer element 100 may include a first terminal 102, which may be an electrical ground, a second terminal 104, which may be an output signal, a third terminal 106, which may be connected to an applied voltage, a potentiometer track 108, a collector track 110, and a wiper 112. The wiper 112 may be coupled to an electrically isolated wiper carrier (not shown). The wiper 112 may be configured to electrically connect and be sliding along a length of the potentiometer track 108 and the collector track 110. Thus, the wiper 112 may provide an electrical connection between the potentiometer track 110 and the collector track 112. The collector track 110 may be coated with a thick film. The output resistance of the potentiometer element 100 may vary depending upon a position of the wiper 112 along the potentiometer track 108 and the collector track 110. The position of the wiper carrier, and thus the wiper 112, may be adjusted using, for example, a spindle, a push rod, or a knob (all not shown).

The wiper 112 may be electrically connected to the potentiometer track 108 and the collector track 110. The wiper 112 may provide an electrical connection between the potentiometer track 108 and the collector track 110.

Figure 2:
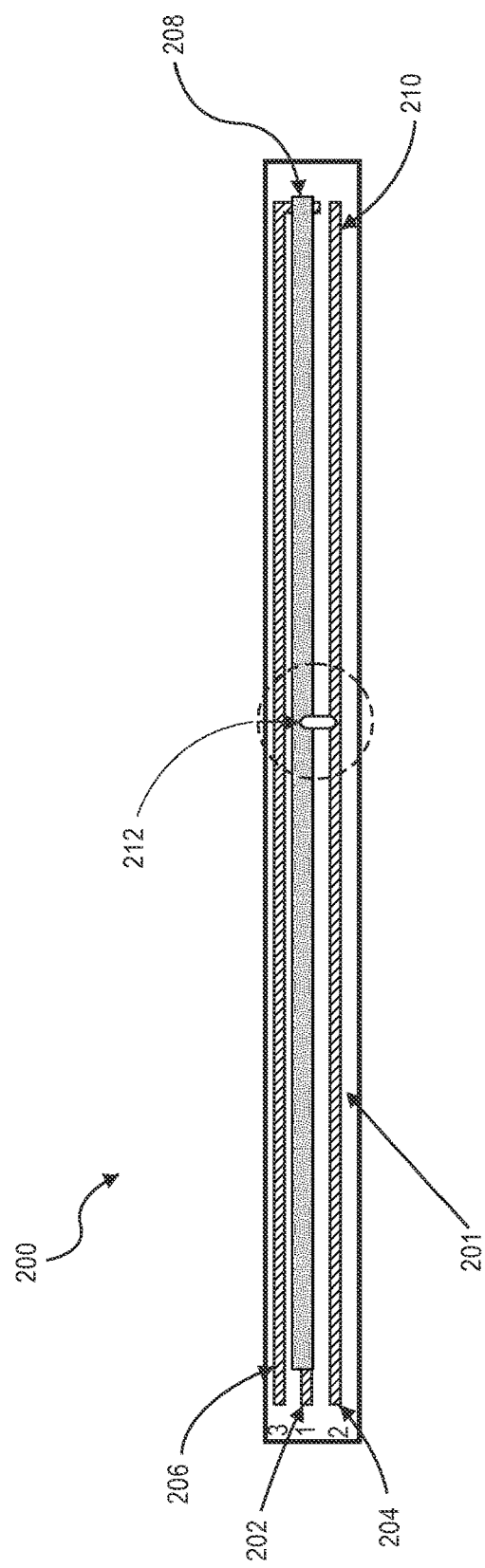
FIG. 2 illustrates a potentiometer element on a PCB using a conductive magnetic cushion, according to one aspect of this disclosure.

FIG. 2 illustrates a potentiometer element 200 on a PCB 201 using a conductive magnetic cushion 212, according to one aspect of this disclosure. The potentiometer element 200 may include a first terminal 202, a second terminal 204, a third terminal 206, a potentiometer track 208, a collector track 210, and a conductive magnetic cushion 212. The conductive magnetic cushion 212 may provide an electrical connection between the potentiometer track 208 and the collector track 210.

The first terminal 202 may be an electrical terminal extending from a first end of the potentiometer track 208. The third terminal 206 may also be an electrical terminal extending from a second end of the potentiometer track 208. The second terminal 204 may also be an electrical terminal extending from an end of the collector track 210. In one aspect, the first terminal 202, the second terminal 204, and the third terminal 206 may extend from a body 502 (see FIG. 5) of the potentiometer element 200.

The potentiometer track 208 and the collector track 210 may be positioned opposite each other. Also, in another aspect, the potentiometer track 208 and the collector track 210 may be positioned such that they are parallel to each other. Additionally, the potentiometer track 208 and the collector track 210 may be disposed along a sidewall (not shown) of the body 502 of the potentiometer element 200.

For example, the potentiometer element 200 may be connected to a circuit (not shown) via the first terminal 202, the second terminal 204, and/or the third terminal 206. If the potentiometer element 200 is connected to the circuit via the first terminal 202, which may be an electrical ground, and the third terminal 206, which may be connected to an applied voltage, the output voltage of the linear potentiometer element 200 would be available at the second terminal 204. However, if the potentiometer element 200 is connected to the circuit via the first terminal 202 and the second terminal 204, the sensor is functioning as a variable resistor also named a rheostat instead of the potentiometer element 200. The variable resistance may depend on the position of the conductive magnetic cushion 212. For example, if the conductive magnetic cushion 212 is positioned near the leftmost edge of the potentiometer track 208 and the collector track 210, the output resistance of the potentiometer element 200 may be at or close to its minimum resistance. However, if the conductive magnetic cushion 212 is positioned near the rightmost edge of the potentiometer track 208 and the collector track 210, the output resistance of the potentiometer element 200 may be at or close to its maximum resistance. The maximum resistance is the resistance provided by the potentiometer track 208. Therefore, a user may adjust the output resistance of the potentiometer element 200 by moving the conductive magnetic cushion 212 along the length of the potentiometer track 208 and the collector track 210.

The conductive magnetic cushion 212 may comprise a conductive jelly. The conductive jelly may include carbon black, a magnetic ferrite powder, or other similar materials. The magnetic ferrite powder may have little or no remanence. Additionally, the ferromagnetic powder may be isotropic or anisotropic. The conductive jelly may be chemically composed such that a surface of the conductive jelly will build a skin after the conductive jelly is applied to surfaces of the potentiometer track 208 and the collector track 210. Alternatively, the conductive magnetic cushion 212 may comprise a conductive jelly incorporating carbon black and a ferromagnetic powder. The ferromagnetic powder may be, for example, nickel powder. By adding a ferromagnetic powder, such as nickel powder, to the conductive jelly with carbon black, the conductivity of the conductive jelly may be improved. Alternatively, the conductive magnetic cushion 212 may comprise carbon black and a ferromagnetic material powder with high remanence. In this aspect, the high remanence may improve a distance between an actuator magnet (314 in FIG. 5) located outside of the body 502 containing the potentiometer element 200 and the conductive magnetic cushion 212. In this aspect, the strength of the actuator magnet 314 may be greater than the remanence of the ferromagnetic powder to actuate the conductive magnetic cushion 212.

The conductivity of the conductive magnetic cushion 212 may be based on the amount of carbon black dispersed in the already conductive jelly. Thus, the conductive magnetic cushion 212 may not require precious metal to influence its conductivity.

The conductive magnetic cushion 212 may have a flexible build. This flexible build allows the conductive magnetic cushion 212 to have a high area of contact points with the potentiometer track 208 and the collector track 210 at a low contact force. This, in turn, may result in low friction between the conductive magnetic cushion 212 and the potentiometer track 208 and the collector track 210. The high area of contact points and the low friction may result in a system which may be actuated from the outside of a completely sealed body 502. Additionally, since the conductive magnetic cushion 212 may have low friction, there will also be little hysteresis between the conductive magnetic cushion 212 and the actuator magnet. Additionally, the system may be sealed so that it meets the International Protection Marking 68 (IP 68) standard for protection providing against intrusion or contamination. One means to actuate the conductive magnetic cushion 212 may be an actuator magnet 314. The potentiometer element 200 may be placed within a fuel tank of an automotive vehicle to measure its fuel content level. Alternatively, the potentiometer element 200 may be placed on the outside of the fuel tank. If the potentiometer element 200 is placed on the outside of the fuel tank, the fuel tank may be made of non-ferromagnetic material.

By using the conductive magnetic cushion 212 rather than the systems of the prior art, the potentiometer element 200 may not require a spindle or push rod, a sealing system, a bearing, a wiper carrier, or a wiper. Thus, since potentiometer element 200 may require fewer parts, the potentiometer element 200 may also cost less to produce in terms of component and labor costs. Additionally, since the conductive magnetic cushion 212 may allow the potentiometer element 200 to require fewer parts, the overall size of the potentiometer element 200 may be smaller as well. Moreover, a width of the potentiometer track 108 and the collector track 110 may be one-third of the normal size. This also may result in a smaller potentiometer element 200.

For example, one application of the potentiometer element 200 may be to measure a level of a liquid in a container, such as fuel in a fuel tank of an automotive vehicle. The potentiometer element 200 may be coupled to the fuel tank and a circuit measuring or sensing the output voltage of the potentiometer element 200. The actuator magnet 314 may be placed within the fuel. For example, if the fuel level is low, the conductive magnetic cushion 212 may be at or near the leftmost end of the potentiometer element 200 due to the movement of the actuator magnet 314 from one position to another. Thus, the potentiometer element 200 may provide low voltage to the coupled circuit. Thus, the potentiometer element 200 may indicate that the fuel level is low when there is a low output voltage. As the fuel level increases, the magnet 314 may also rise with the fuel. The rising of actuator magnet 314 may actuate the conductive magnetic cushion 212 to move towards the rightmost end of the potentiometer element 200. As the conductive magnetic cushion 212 moves toward the rightmost end, the output voltage of the potentiometer element 200 may increase. Thus, as the fuel level rises, the output voltage of the potentiometer element 200 may increase. Thus, the circuit coupled to the potentiometer element 200 may sense or measure the output voltage of the potentiometer element 200 to determine the fuel level in the fuel tank. As one of ordinary skill in the art would recognize, the inverse relationship between output resistance and fuel level may also be possible.

Figure 3:
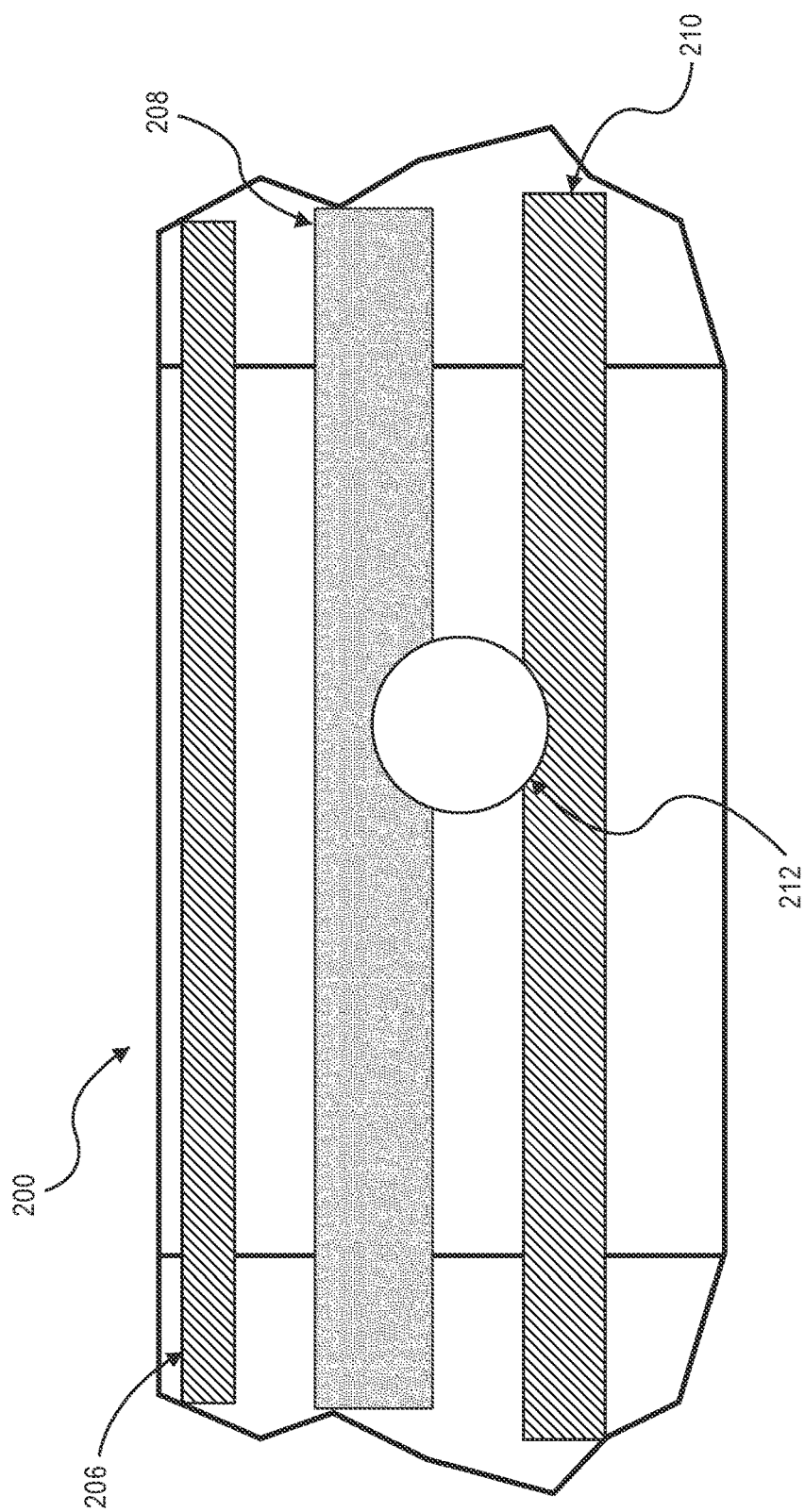
FIG. 3 illustrates a magnified view of the potentiometer element not subject to a magnetic field, according to one aspect of this disclosure.

FIG. 3 illustrates a magnified view of the potentiometer element 200 of FIG. 2 not subject to a magnetic field, according to one aspect of this disclosure. Here, the conductive magnetic cushion 212 may have a circular outline as a normal outline. Normal outlines other than a circular outline may be possible. Since a magnetic field is not being applied to the conductive magnetic cushion 212, the conductive magnetic cushion 212 does not move relative to the potentiometer track 208 and the collector track 210 and the magnetic cushion 212 may retain its circular outline.

Figure 4:
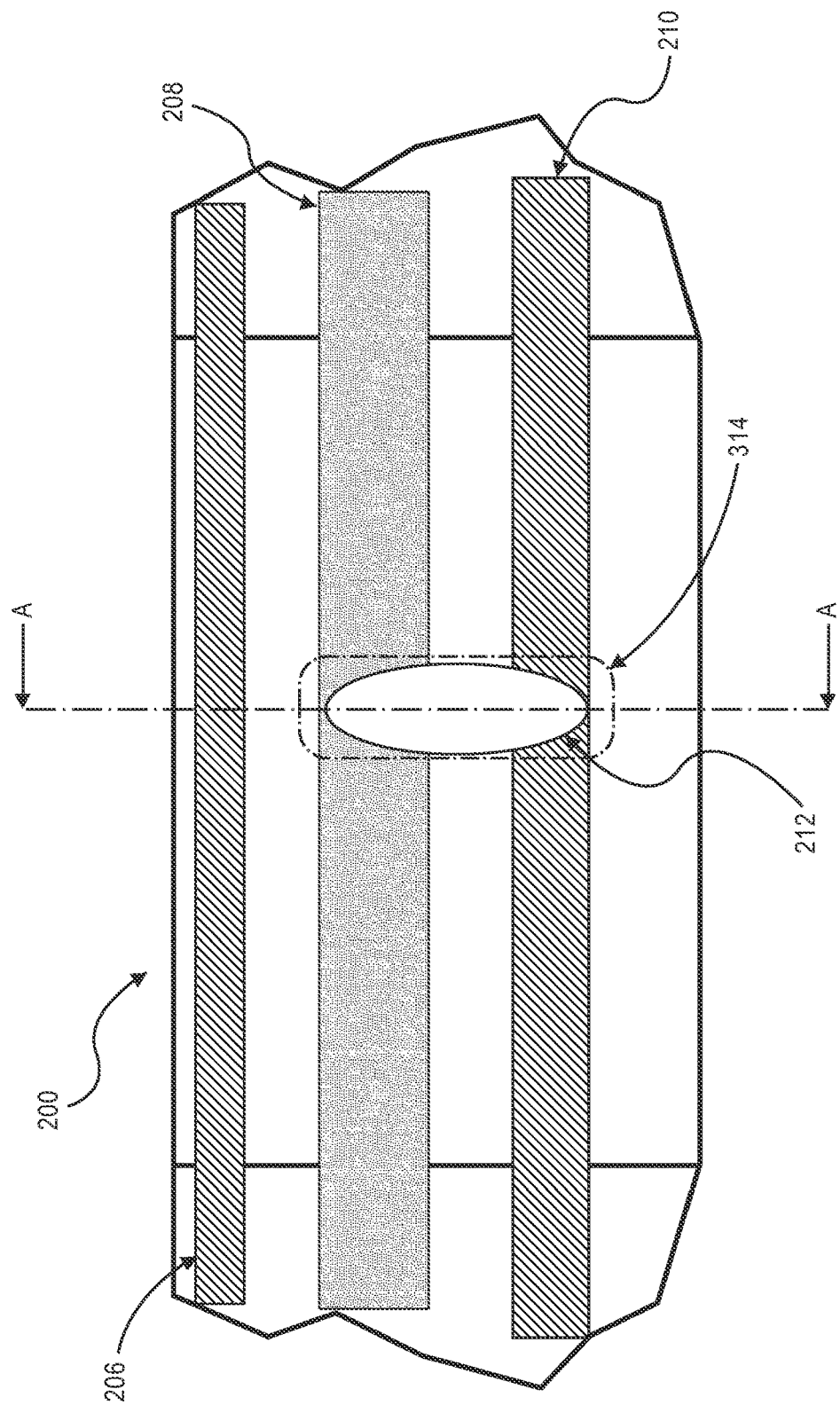
FIG. 4 illustrates a magnified view of the potentiometer element subject to a magnetic field, according to one aspect of this disclosure.
Figure 5:
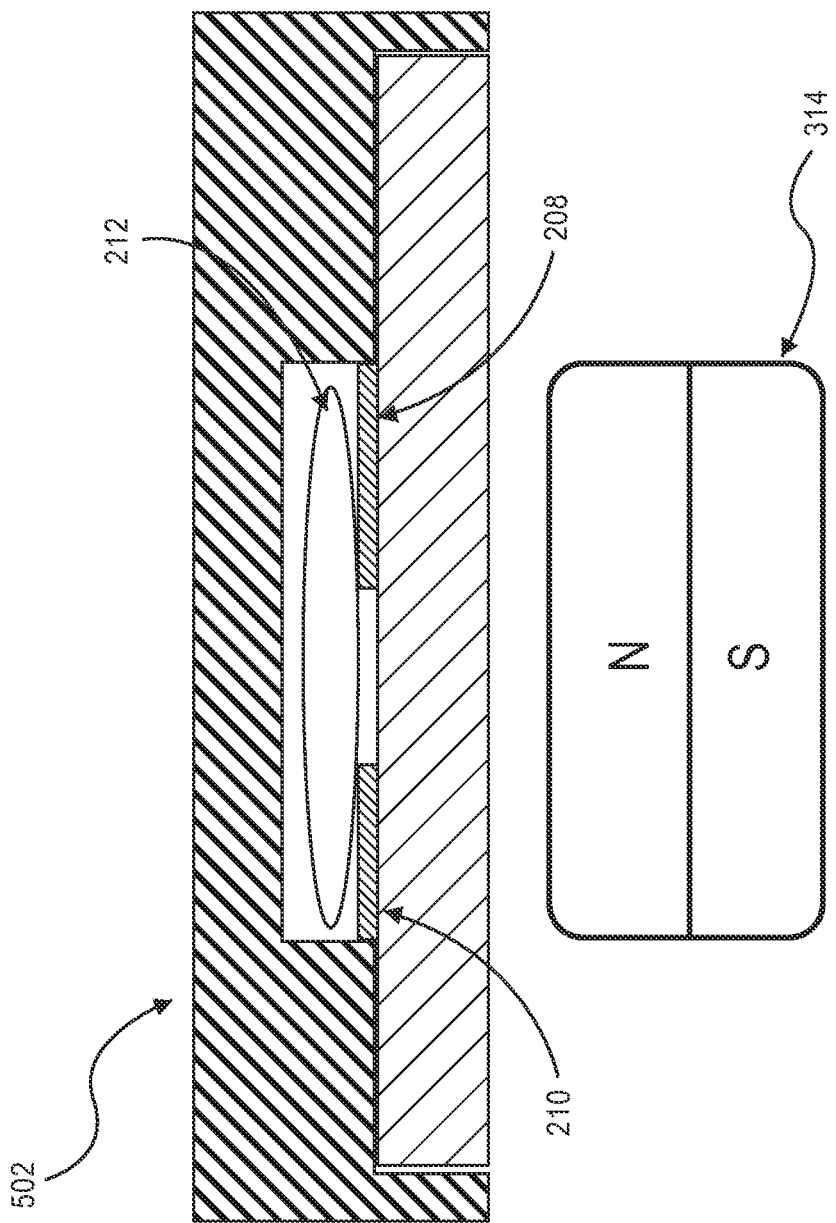
FIG. 5 is a cross-sectional view along the line A-A of FIG. 4, according to one aspect of this disclosure.

FIG. 4 illustrates a magnified view of the potentiometer element 200 subject to a magnetic field, according to one aspect of this disclosure. In addition to the elements shown and described in FIG. 2, FIG. 4 includes an actuator magnet 314. In FIG. 4, the actuator magnet 314 is outside of and underneath (as shown in FIG. 5) the body 502 of the potentiometer element 200. The magnetic field emanating from the actuator magnet 314 may interact with the conductive magnetic cushion 212. One effect of this interaction may be a deformation of the shape of the conductive magnetic cushion 212 from the normal or circular outline. The dimensions and the shape of the conductive magnetic cushion 212 may be altered depending on the magnetic field. For example, the dimensions and shape may depend on the position and strength of the magnetic field. Referring to FIG. 3, the conductive magnetic cushion 212 has a circular outline. However, with the application of the actuator magnet 314 to the potentiometer element 200, the conductive magnetic cushion 212 may deform to have an oval or oblong outline. The conductive magnetic cushion 212 may deform to shapes other than an oval or oblong.

For example, in operation, if the actuator magnet 314 is brought in close proximity to, but not necessarily within, the body 502 of the potentiometer element 200, the magnetic field emanating from the actuator magnet 314 may interact with the conductive magnetic cushion 212. In response, the conductive magnetic cushion 212 may undergo a deformation. The deformation, for example, may cause the conductive magnetic cushion 212 to deform from a circular shape to an oval, oblong, or other shapes. If a user moves the actuator magnet 314 in a direction along the potentiometer track 208 and the collector track 210, the conductive magnetic cushion 212 would move as well. The conductive magnetic cushion 212 would move because, for example, there is a high area of contact points with the potentiometer track 208 and the collector track 210 as well as low friction between the conductive magnetic cushion 212 and the potentiometer track 208 and the collector track 210.

FIG. 5 is a cross-sectional view along the line A-A of FIG. 4, according to one aspect of this disclosure. FIG. 5 illustrates the potentiometer track 208, the collector track 210, the conductive magnetic cushion 212, the actuator magnet 314, and a body 502 completely sealing the potentiometer element 200. Since the conductive magnetic cushion 212 is actuated using the actuator magnet 314 located outside of the body 502, the body 502 may completely seal the potentiometer element 200. Thus, there may be no point of ingress for contamination. Although the actuator magnet 314 is shown as having the north pole oriented above the south pole, one of ordinary skill in the art would recognize that other orientations, such as orienting the south pole above the north pole, may be possible. The orientation of the magnet 314 may depend on the specific design of the potentiometer element 200.

Figure 6:
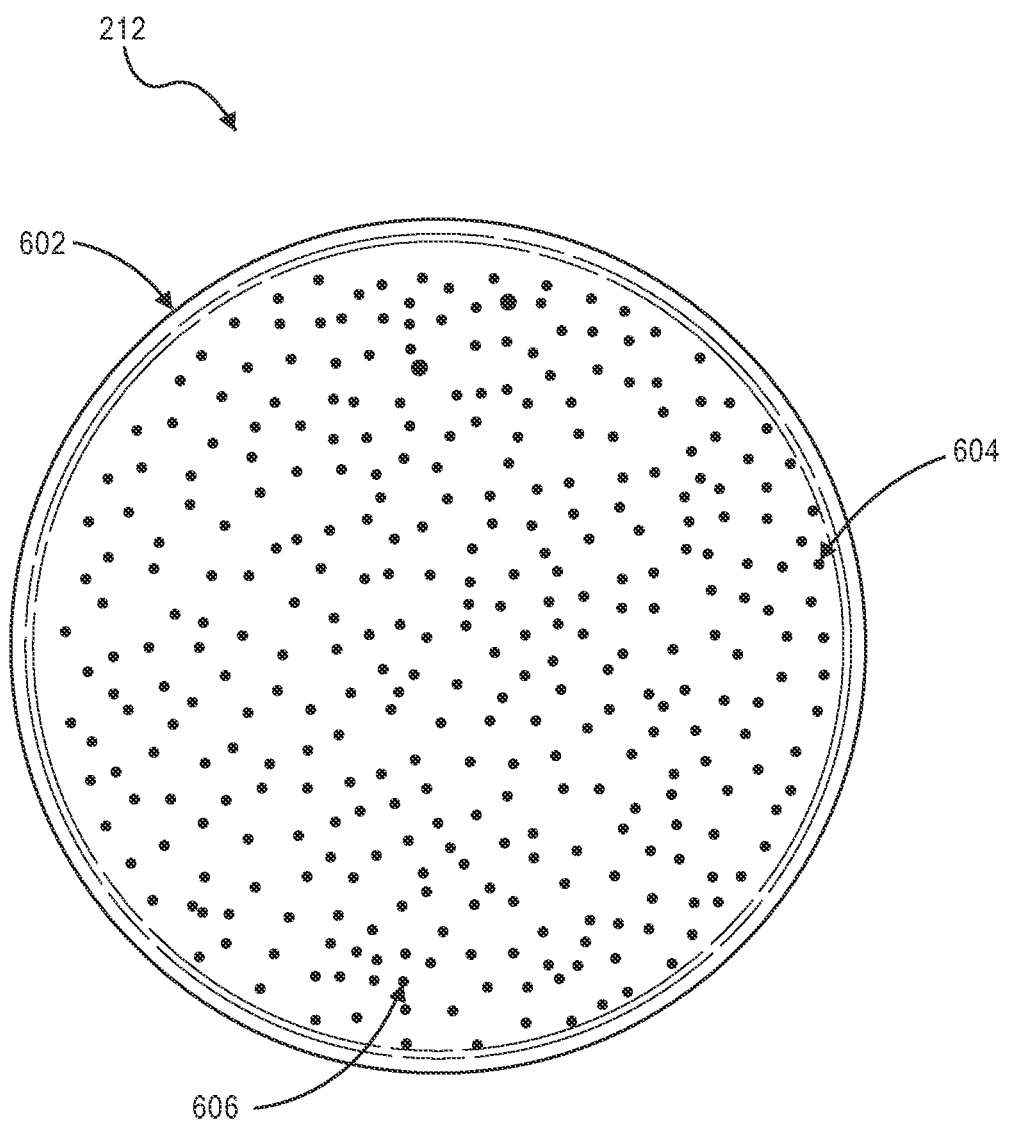
FIG. 6 illustrates a composition of the conductive magnetic cushion, according to one aspect of this disclosure.

FIG. 6 illustrates a composition of the conductive magnetic cushion 212, according to one aspect of this disclosure. The conductive magnetic cushion 212 may comprise a conductive lubricant 602, carbon black filler 604, and ferromagnetic material 606. The conductive lubricant 602 may be a lubricant which can withstand extreme temperatures so that the potentiometer element 200 may function in a wide range of conditions and in harsh conditions. For example, the conductive lubricant 602 may have a freezing point of −45° C. and a boiling point of +125° C. Other ranges of freezing points (lower and higher) and boiling points (lower and higher) are also possible depending on the type of conductive lubricant and other materials that make up the conductive magnetic cushion 212. The carbon black filler 604 may be added to the conductive lubricant 602 to increase the conductivity of the conductive lubricant 602. Thus, the conductive lubricant 602 may not require precious metals to increase the conductivity of the conductive lubricant 602. The conductive lubricant 602 may also include a ferromagnetic material 606. The ferromagnetic material 606 may be a nickel powder, which may also improve the conductivity of the conductive lubricant 602. Additionally, the ferromagnetic material 606 may have high remanence, which may allow for a greater distance between the actuator magnet 314 and the body 502 of the potentiometer element 200. If the ferromagnetic material 606 has remanence, the strength of the magnet 314 may be higher than the remanence of the ferromagnetic material 606 to actuate the conductive magnetic cushion 212.

Figure 7:
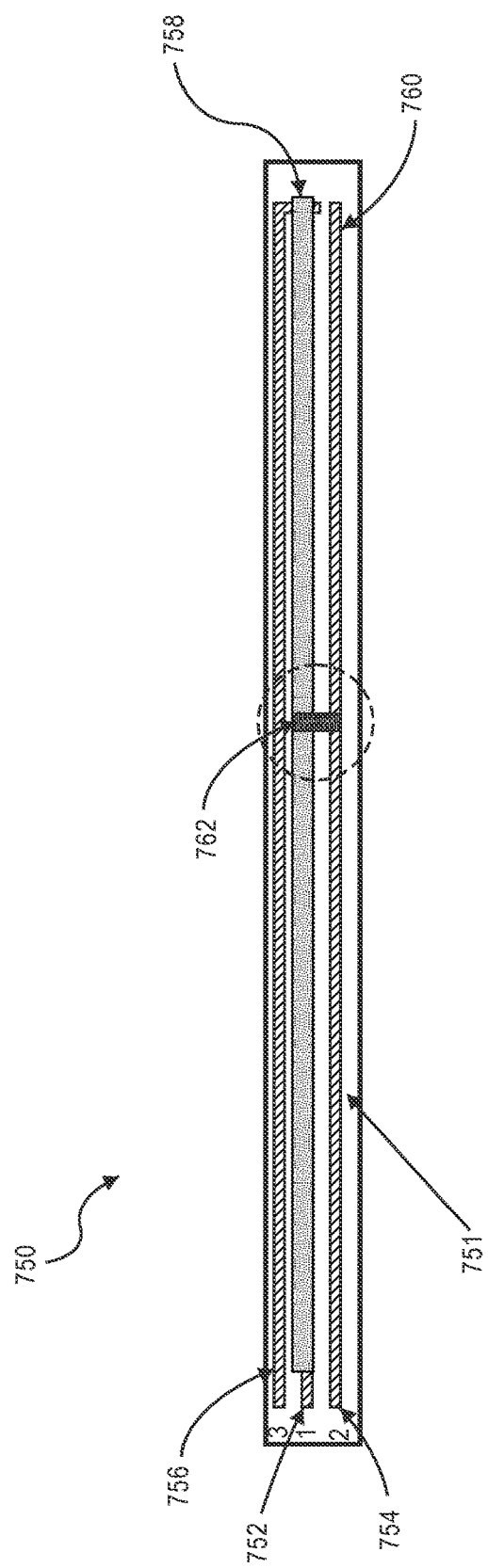
FIG. 7 illustrates a potentiometer element on a PCB using a coil system, according to one aspect of this disclosure.

FIG. 7 illustrates a potentiometer element on a PCB using a coil system, according to one aspect of this disclosure. FIG. 7 illustrates a potentiometer element 750 on a PCB 751 using a coil system 762, according to one aspect of this disclosure. The potentiometer element 750 may include a first terminal 752, a second terminal 754, a third terminal 756, a potentiometer track 758, a collector track 760, and a coil system 762. The coil system 762 may provide an electrical connection between the potentiometer track 758 and the collector track 760.

The first terminal 752 may be an electrical terminal extending from a first end of the potentiometer track 758. The third terminal 756 may also be an electrical terminal extending from a second end of the potentiometer track 758. The second terminal 754 may also be an electrical terminal extending from an end of the collector track 760. In one aspect, the first terminal 752, the second terminal 754, and the third terminal 756 may extend from a body 502 (see FIG. 5) of the potentiometer element 750.

The potentiometer track 758 and the collector track 760 may be positioned opposite each other. Also, in another aspect, the potentiometer track 758 and the collector track 760 may be positioned such that they are parallel to each other. Additionally, the potentiometer track 758 and the collector track 760 may be disposed along a sidewall (not shown) of the body 502 of the potentiometer element 750.

For example, the potentiometer element 750 may be connected to a circuit (not shown) via the first terminal 752, the second terminal 754, and/or the third terminal 756. If the potentiometer element 750 is connected to the circuit via the first terminal 752, which may be an electrical ground, and the third terminal 56, which may be connected to an applied voltage, the output voltage of the linear potentiometer element 750 would be available at the second terminal 754. However, if the potentiometer element 750 is connected to the circuit via the first terminal 752 and the second terminal 754, the sensor is functioning as a variable resistor also named a rheostat instead of the potentiometer element 750. The variable resistance may depend on the position of the coil system 762. For example, if the coil system 762 is positioned near the leftmost edge of the potentiometer track 758 and the collector track 760, the output resistance of the potentiometer element 750 may be at or close to its minimum resistance. However, if the coil system 762 is positioned near the rightmost edge of the potentiometer track 758 and the collector track 760, the output resistance of the potentiometer element 750 may be at or close to its maximum resistance. The maximum resistance is the resistance provided by the potentiometer track 758. Therefore, a user may adjust the output resistance of the potentiometer element 750 by moving the coil system 762 along the length of the potentiometer track 758 and the collector track 760.

Additionally, the system may be sealed so that it meets the International Protection Marking 68 (IP 68) standard for protection providing against intrusion or contamination. One means to actuate the coil system 762 may be the actuator magnet 314. The potentiometer element 750 may be placed within a fuel tank of an automotive vehicle to measure its fuel content level. Alternatively, the potentiometer element 750 may be placed on the outside of the fuel tank. If the potentiometer element 750 is placed on the outside of the fuel tank, the fuel tank may be made of non-ferromagnetic material.

By using the coil system 762 rather than the systems of the prior art, the potentiometer element 750 may not require a spindle or push rod, a sealing system, a bearing, a wiper carrier, or a wiper. Thus, since potentiometer element 750 may require fewer parts, the potentiometer element 750 may also cost less to produce in terms of component and labor costs. Additionally, since the coil system 762 may allow the potentiometer element 750 to require fewer parts, the overall size of the potentiometer element 750 may be smaller as well. Moreover, a width of the potentiometer track 758 and the collector track 760 may be one-third of the normal size. This also may result in a smaller potentiometer element 750.

Figure 8A:
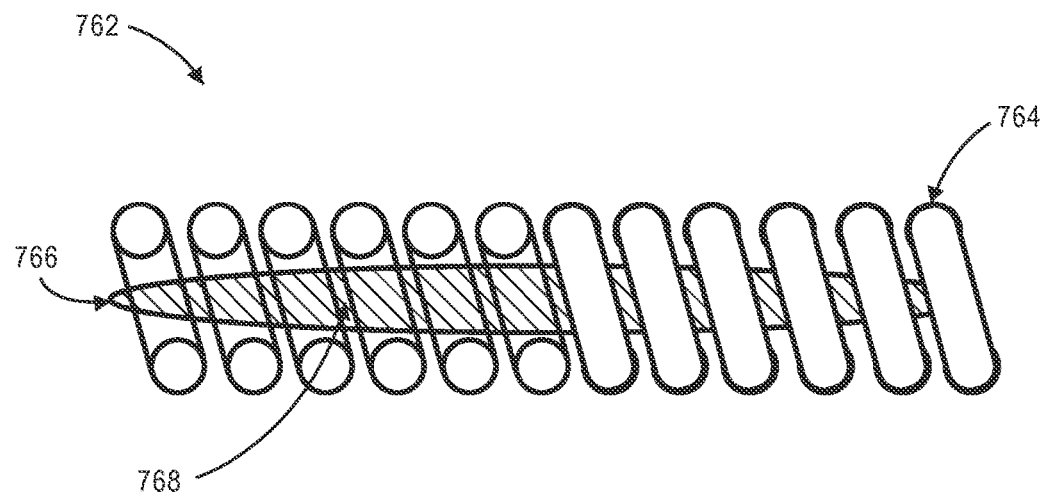
FIG. 8A illustrates a coil system, according to one aspect of this disclosure.

FIG. 8A illustrates the coil system 762, according to one aspect of this disclosure. The coil system 762 may comprise a ferromagnetic micro coil 764, a ferrite powder 766, and a jelly 768. The ferromagnetic micro coil 764 may be composed of, for example, a nickel-iron alloy. However, the ferromagnetic micro coil 764 may be composed of other elements or alloys that exhibit ferromagnetic properties. The ferromagnetic micro coil 764 may be partially or completely filled or coated with the ferrite powder 766. The ferrite powder 766 may be mixed or interspersed inside the jelly 768. The jelly 768 enclosed by the ferromagnetic micro coil 768 may be the same material as the conductive lubricant 602. However, in this aspect of this disclosure, the jelly 768 may not need to be conductive. Thus, a ferrite jelly 768 that reacts or responds to magnetic stimuli may be sufficient. A conductive jelly 768 may be used to improve the electrical conductivity of the coil system 762.

In this aspect, the ferromagnetic micro coil 764 may provide the electrical connection between the potentiometer track 758 and the collector track 760. Since the ferromagnetic micro coil 764 may be composed of a ferromagnetic material, the magnet 314 (see FIG. 5) may also be used to control the position of the ferromagnetic micro coil 764 along the potentiometer track 758 and the collector track 760. However, to improve the movement of the ferromagnetic micro coil 764 in response to changes in position of the magnet 314, the jelly 768 containing the ferrite powder 766 may be inserted inside the ferromagnetic micro coil 764 so that the jelly 768 and the ferrite powder 766 are enclosed by the ferromagnetic micro coil 764. The jelly 768 containing the ferrite powder 766 may exhibit a stronger response to the magnetic field generated by the magnet 314. Thus, since the jelly 768 containing the ferrite powder 766 is located within the ferromagnetic micro coil 764, moving the jelly 768 containing the ferrite powder 766 would also result in movement of the ferromagnetic micro coil 764. The jelly 768 containing the ferrite powder 766 may leave enough space within the ferromagnetic micro coil 764 so that the ferromagnetic micro coil 764 may adjust to an uneven surface, such as when the potentiometer track 758 and the collector track 760 are not in the same plane.

Figure 8B:
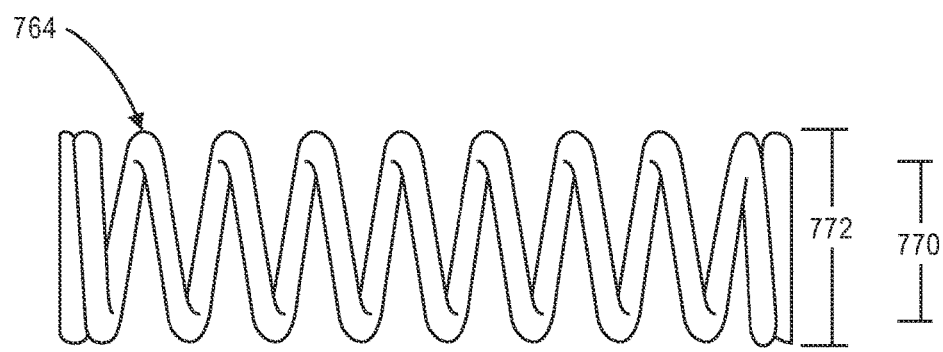
FIG. 8B illustrates the ferromagnetic micro coil, according to one aspect of this disclosure.

FIG. 8B illustrates the ferromagnetic micro coil 764, according to one aspect of this disclosure. A cross-sectional shape of the ferromagnetic micro coil 764 may be any suitable shape. For example, the cross-sectional shape may be substantially circular with an inner coil diameter 770 and an outer coil diameter 772. The closer the outer coil perimeter resembles a circle, the better contact the ferromagnetic micro coil 764 will make with the potentiometer track 758 and the collector track 760.

For example, one application of the potentiometer element 750 may be to measure a level of a liquid in a container, such as fuel in a fuel tank of an automotive vehicle. The potentiometer element 750 may be coupled to the fuel tank and a circuit measuring or sensing the output voltage of the potentiometer element 750. The actuator magnet 314 may be placed within the fuel. For example, if the fuel level is low, the coil system 762 may be at or near the leftmost end of the potentiometer element 750 due to the movement of the actuator magnet 314 from one position to another. Thus, the potentiometer element 750 may provide low voltage to the coupled circuit. Thus, the potentiometer element 750 may indicate that the fuel level is low when there is a low output voltage. As the fuel level increases, the magnet 314 may also rise with the fuel. The rising of actuator magnet 314 may actuate the coil system 762 to move towards the rightmost end of the potentiometer element 750. As the coil system 762 moves toward the rightmost end, the output voltage of the potentiometer element 750 may increase. Thus, as the fuel level rises, the output voltage of the potentiometer element 750 may increase. Thus, the circuit coupled to the potentiometer element 750 may sense or measure the output voltage of the potentiometer element 750 to determine the fuel level in the fuel tank.

As one of ordinary skill in the art would recognize, the inverse relationship between output resistance and fuel level may also be possible.

Figure 9:
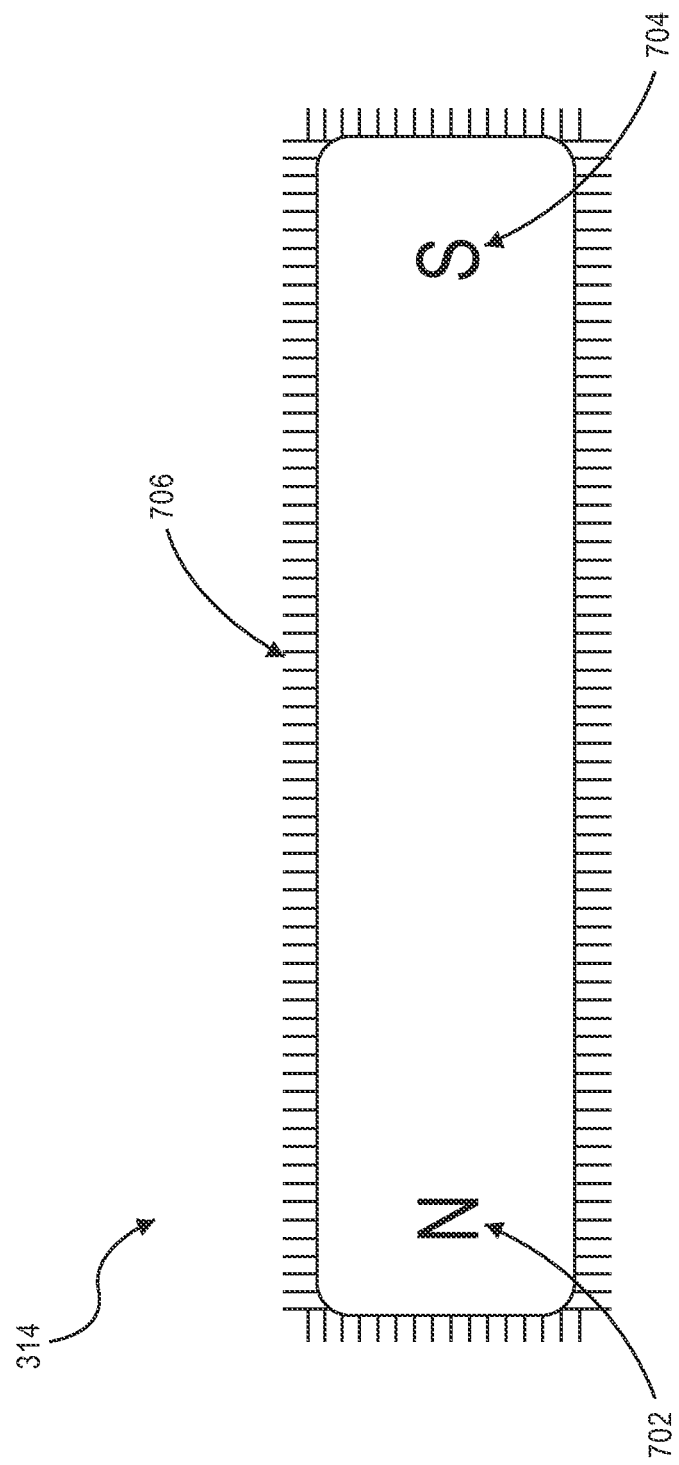
FIG. 9 illustrates the magnet, according to one aspect of this disclosure.

FIG. 9 illustrates the magnet 314, according to one aspect of this disclosure. The actuator magnet 314 may have a north pole 702 and a south pole 704. Additionally, the actuator magnet 314 may be flocked. For example, the actuator magnet 314 may be a permanent rod magnet flock coated with carbon fiber 706. The actuator magnet 314 may be flocked with other materials as well. The actuator magnet 314 may be flocked because, for example, flocking may produce a fibered grip on the actuator magnet 314 and flocking may result in a good sliding effect on even surfaces, such as to traverse the body 502 of the potentiometer element 200, 750.

Figure 10:
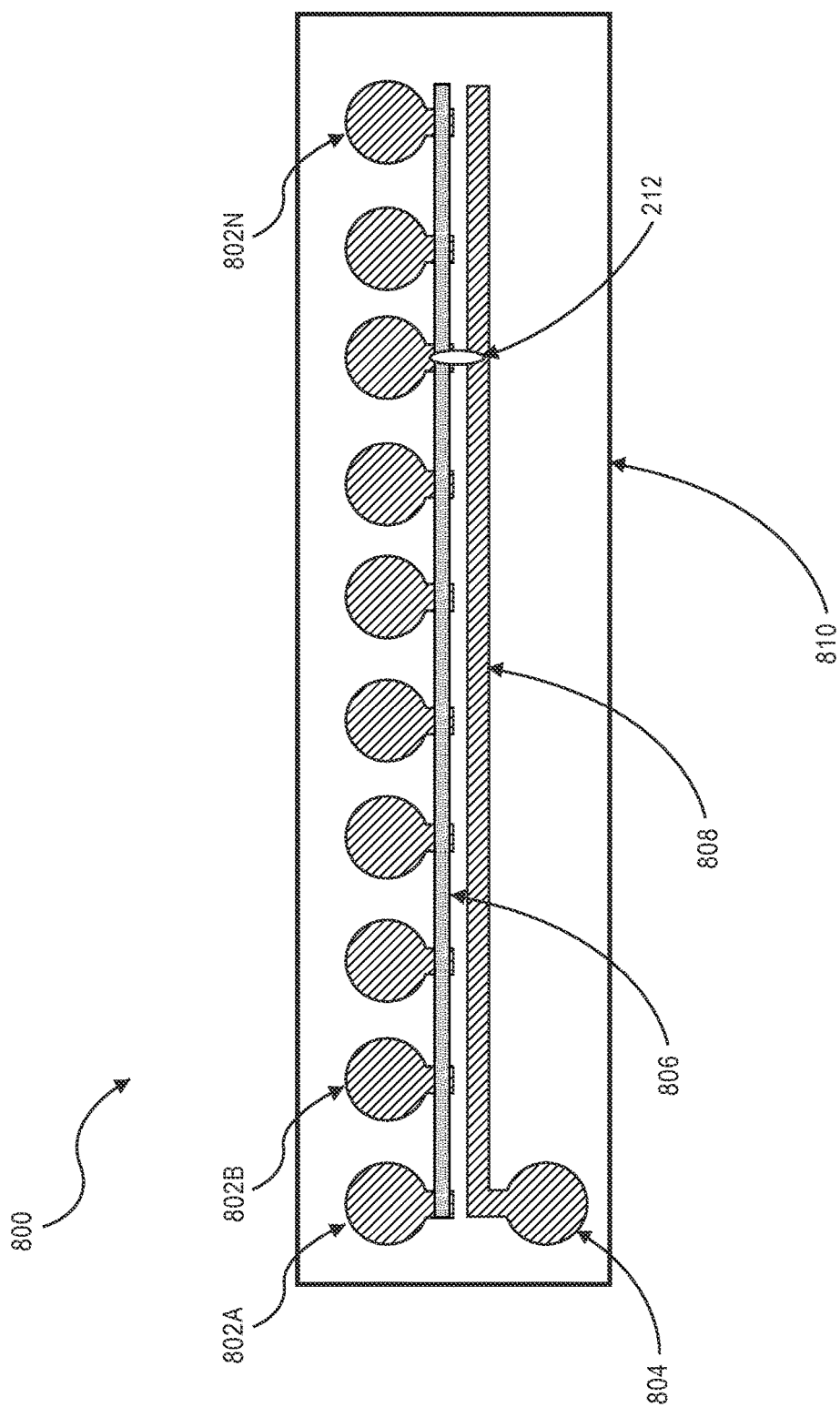
FIG. 10 illustrates the conductive magnetic cushion in a switch application, according to one aspect of this disclosure.

FIG. 10 illustrates the conductive magnetic cushion 212 in a switch application 800, according to one aspect of this disclosure. The switch application 800 may include a plurality of switches 802a, 802b . . . 802n. The switch application 800 may also include an output 804. The switch application may also include a resistance track 806 and a collector track 808. The switch application 800 may also include the conductive magnetic cushion 212. The conductive magnetic cushion 212 may be actuated by an actuator magnet 314. Similar to the potentiometer element 200 described above, the conductive magnetic cushion 212 may slide along the resistance track 806 and the collector track 808. The conductive magnetic cushion 212 may then be positioned to provide an electrical connection between one of the plurality of switches 802a, 802b . . . 802n and the output 804. The switch application 800 may also be enclosed in a body 810. The body 810 may completely seal the switch application 800. For example, the switch application 800 may be sealed so that it meets the International Protection Marking 68 (IP 68) standard for protection providing against intrusion. Additionally, in one aspect, the actuator magnet 314 used to actuate the conductive magnetic cushion 212 in the switch application 800 may be a permanent rod magnet flock coated with carbon fiber.

For example, the switch application 800 may be used to measure a level of a liquid in a container, such as fuel in a fuel tank of an automotive vehicle. The switch application 800 may be coupled to the fuel tank and a circuit measuring or sensing the output of the switch application 800. The actuator magnet 314 may be placed within the fuel so that it rises and falls with the fuel level. For example, if the fuel level is low, the position of the actuator magnet 314 may cause the conductive magnetic cushion 212 to be at or near the leftmost end of the switch application 800. Thus, the switch application 800 may provide an output indicating a low fuel level to the coupled circuit. As the fuel level increases, the actuator magnet 314 may also rise with the fuel and may actuate the conductive magnetic cushion 212 to move towards the rightmost end of the switch application 800. As the conductive magnetic cushion 212 moves toward the rightmost end, the output of the switch application 800 may provide an output indicating a high fuel level to the coupled circuit. Thus, the circuit coupled to the switch application 800 may sense or measure the output of the switch application 800 to determine the fuel level in the fuel tank.

Figure 11:
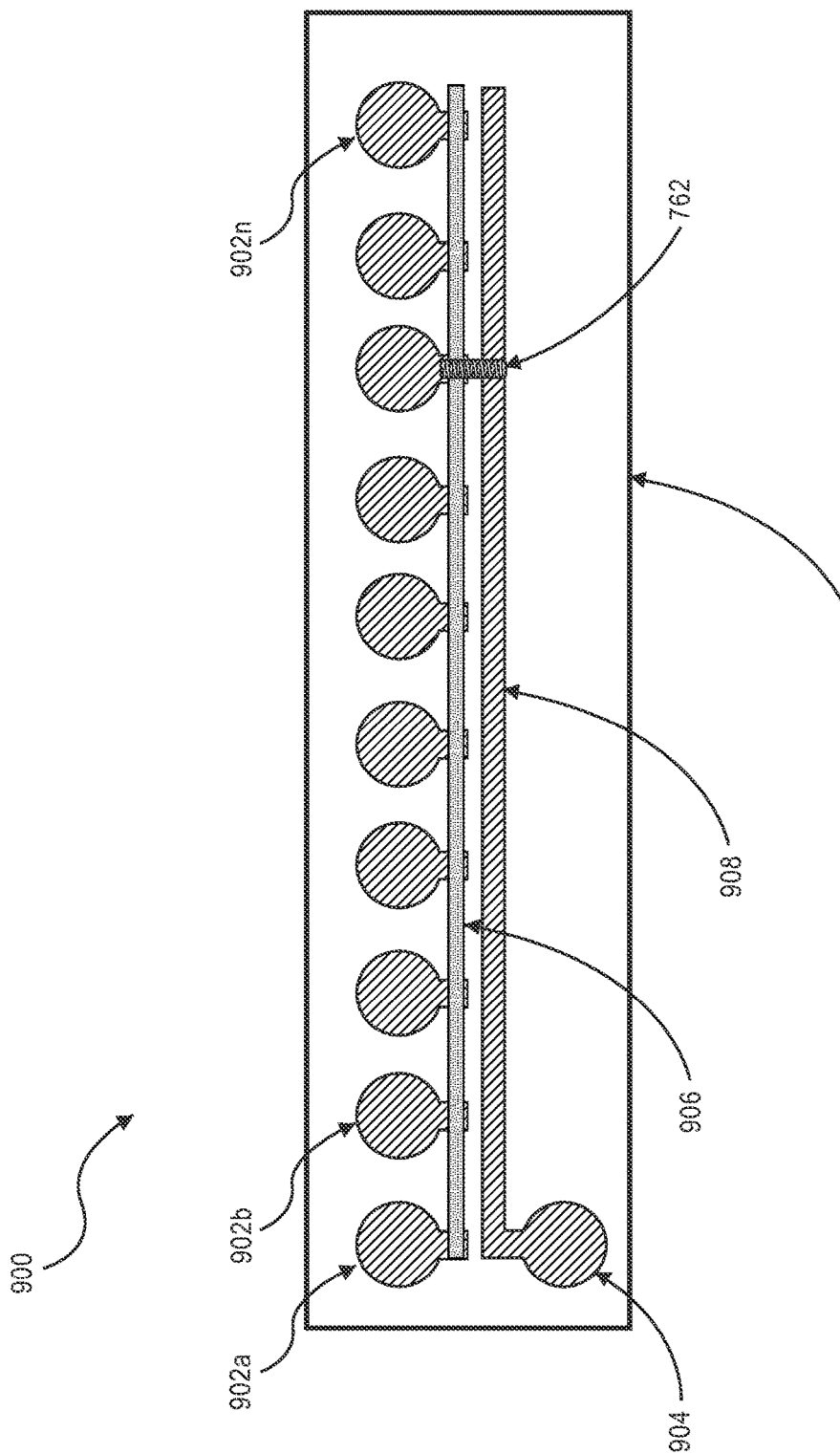
FIG. 11 illustrates the coil system 762 in a switch application 900, according to one aspect of this disclosure

FIG. 11 illustrates the coil system 762 in a switch application 900, according to one aspect of this disclosure. The switch application 900 may include a plurality of switches 902a, 902b . . . 902n. The switch application 900 may also include an output 904. The switch application 900 may also include a resistance track 906 and a collector track 908. The switch application 900 may also include the coil system 762. The coil system 762 may be actuated by an actuator magnet 314. Similar to the potentiometer element 750 described above, the coil system 762 may move along the resistance track 906 and the collector track 908. The coil system 762 may then be positioned to provide an electrical connection between one of the plurality of switches 902a, 902b . . . 902n and the output 904. The switch application 900 may also be enclosed in a body 910. The body 910 may completely seal the switch application 900. For example, the switch application 900 may be sealed so that it meets the International Protection Marking 68 (IP 68) standard for protection providing against intrusion. Additionally, in one aspect, the actuator magnet 314 used to actuate the coil system 762 in the switch application 900 may be a permanent rod magnet flock coated with carbon fiber.

For example, the switch application 900 may be used to measure a level of a liquid in a container, such as fuel in a fuel tank of an automotive vehicle. The switch application 900 may be coupled to the fuel tank and a circuit measuring or sensing the output 904 of the switch application 900. The actuator magnet 314 may be placed within the fuel so that it rises and falls with the fuel level. For example, if the fuel level is low, the position of the actuator magnet 314 may cause the coil system 762 to be at or near the leftmost end of the switch application 900. Thus, the switch application 900 may provide an output indicating a low fuel level to the coupled circuit. As the fuel level increases, the actuator magnet 314 may also rise with the fuel and may actuate the coil system 762 to move towards the rightmost end of the switch application 900. As the coil system 762 moves toward the rightmost end, the output 904 of the switch application 900 may provide an output indicating a high fuel level to the coupled circuit. Thus, the circuit coupled to the switch application 900 may sense or measure the output of the switch application 900 to determine the fuel level in the fuel tank.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain exemplary aspects have been described, these aspects have been presented by way of example only, and are not intended to limit the scope of the disclosure. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of certain aspects of the disclosure.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

I claim:

1. A potentiometric sensor, comprising:
   a potentiometer track;
   a collector track opposite the potentiometer track;
   a ferromagnetic coil connecting the potentiometer track and the collector track; and
   a sealed body housing the potentiometer track, the collector track, and the ferromagnetic coil.

2. The potentiometric sensor of claim 1, wherein the sealed body seals the potentiometric sensor to meet International Protection Marking 68 standard.

3. The potentiometric sensor of claim 1,
   wherein the potentiometric sensor is coupled to a fuel tank of an automotive vehicle and a circuit measuring an output resistance of the potentiometric sensor, and
   wherein the output resistance of the potentiometric sensor is based on a level of fuel in the fuel tank of the automotive vehicle.

4. The potentiometric sensor of claim 3, wherein the output resistance of the potentiometric sensor is further based on a position of a magnet in the fuel.

5. The potentiometric sensor of claim 1, wherein a cross-sectional shape of the ferromagnetic coil is circular.

6. The potentiometric sensor of claim 1, wherein the ferromagnetic coil encloses a ferromagnetic jelly.

7. The potentiometric sensor of claim 6, wherein the ferromagnetic jelly comprises a ferromagnetic powder.

8. The potentiometric sensor of claim 1, wherein the potentiometric sensor further comprises a permanent rod magnet flock coated with carbon fiber.

* * * * *